Feb. 7, 1933.　　　　F. J. ADDIS　　　　1,896,503
THERMOMETER
Filed June 29, 1929
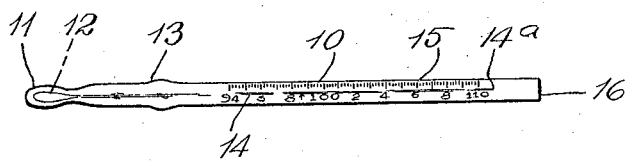
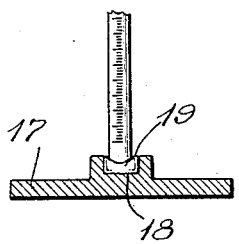
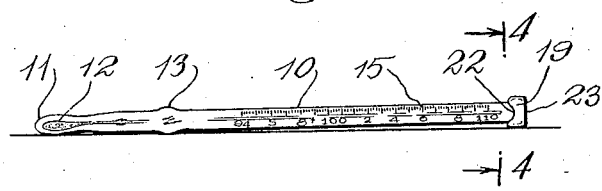
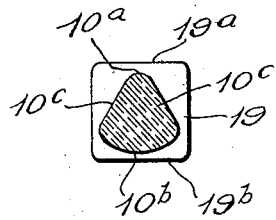
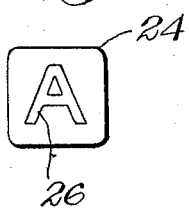
INVENTOR.
Frank J. Addis
BY
ATTORNEY Patented Feb. 7, 1933

1,896,503

UNITED STATES PATENT OFFICE

FRANK J. ADDIS, OF OZONE PARK, NEW YORK

THERMOMETER

Application filed June 29, 1929. Serial No. 374,665.

This invention relates to thermometers and particularly to devices of this class commonly known as medical thermometers used by doctors, nurses and others; and the object of the invention is to provide one end portion of a thermometer of this class with an enlarged angular head formed of the material employed in constructing the thermometer to provide a finger piece producing a firmer grip of the hand upon the thermometer, also serving to prevent the rolling of the thermometer when placed on a table or other support, as well as preventing breakage to the thermometer in placing or dropping the same on a hard surface, and further facilitating the reading of the thermometer when held in the hand or placed on a support; and with this and other objects in view, the invention consists in a device of the class and for the purpose specified, which is simple in construction, efficient in use, and which is constructed in accordance with the method hereinafter more fully described and claimed.

The invention is fully disclosed in the following specification of which the accompanying drawing forms a part in which the separate parts of my improvement are designated by suitable reference characters in each of the views and in which:

Fig. 1 is a side view of a thermometer prior to the formation of my improved head thereon.

Fig. 2 is a detail view showing the method of forming said head.

Fig. 3 is a plan view of the thermometer with one form of head arranged thereon.

Fig. 4 is a transverse section on the line 4—4 of Fig. 3; and,

Fig. 5 is an end view of a thermometer such as shown in Fig. 3 showing a modification.

In Fig. 1 of the drawing, I have shown a frame 10 of the usual or any desired form and construction and having a bulb end 11 containing the mercury or other fluid 12. At 13, I have indicated the position of the contraction or offset chamber controlling the flow of mercury through the bore 14 of the thermometer tube, which bore terminates at its upper end as seen at 14a adjacent the last scale mark of scale 15 employed on the thermometer, the scale markings being of the usual or conventional form. Beyond the end 14a, the thermometer tube 10 has an extension 16 which is adapted to be fashioned to form my improved head construction.

In Fig. 2 of the drawing, I have shown a die or mold blow 17 having a rectangular mold chamber 18 formed therein. In the process of forming the head 19 on the upper end of the thermometer after the same has been completely formed as disclosed in Fig. 1 of the drawing, I apply a flame to the end portion 16 to soften the glass sufficiently so that the insertion of said end 16 into the chamber 18 of the die 17 will cause the glass to flow laterally to fill said chamber and conform with the cross sectional contour thereof, which in the construction shown in Figs. 3 and 4, will be square.

In this connection, it will be understood that sufficient material is provided on the end 16 of the thermometer tube to form the head outwardly of the end 14a of the bore of the thermometer so as not to interfere therewith. In forming the head 19, it is preferred that one flat side 19a of said head be arranged at right angles to the pointed reading edge 10a of the tube 10, whereas the opposite side 19b of the head be arranged in alinement with the rounded back 10b of the thermometer tube, the beveled scale sides 10c of the tube converging to the edge 10a and arranged upon the two other opposed sides of the square head 19. By this arrangement, the square side 19b may be placed upon one finger of the hand, and two other fingers, for example, the thumb and index finger, may be arranged upon opposite side faces of the head to support the thermometer with the pointed edge 10a directed upwardly, facilitating the reading thereof. In like manner, the placement of the thermometer upon a table or other support with the side 19b of the head resting thereon, will facilitate the reading of the thermometer.

It will also be understood that by providing the rectangular head, the thermometer may be firmly gripped between the fingers of a hand in the operation of shaking the mercury down prior to taking a temperature without danger of displacement of the thermometer from the hand.

It will also be apparent that the head will prevent or obviate to a large degree the breaking or cracking of the tube in the careless placement or dropping of the same upon a hard surface, especially if dropped in a horizontal plane, it being understood that the blow will be taken up between the head and an area of the thermometer adjacent the bulb end thereof, all of which features add to the merit and utility of the device, and increase the strength and durability thereof.

At this time, it will also be apparent that heads of other cross sectional contour may be employed as long as relatively flat surfaces are provided, which will prevent the rolling of a thermometer when placed upon a supporting surface.

It will also be seen upon a consideration of Fig. 3 of the drawing that in forming the head 19, the inner surface of said head will be recessed or curved slightly as seen at 22 by virtue of the cross sectional contour of the thermometer tube, whereas the outer face 23 of said head will be flat or substantially so.

As seen in Fig. 5 of the drawing, the square head 24 similar to the head 19 may have arranged on the outer face thereof, a letter of the alphabet or other character such as the letter "A" designated at 26 on the head 24. These characters may be formed in the molding operation by suitably forming the bottom wall of the mold chamber. The references or other characters may be used to identify the manufacturer of the thermometer tube, a distributor or agent, or may identify the owner of the thermometer. In other cases, these means of identifications may be used for the purpose of accurately identifying temperature taken from a patient, especially in hospitals where large numbers of thermometers are employed and temperatures taken from various patients for checking by head nurses or doctors.

Various other changes in and modifications of the construction herein shown and described and the method of producing the thermometers, herein set out, may be made within the scope of the appended claim without departing from the spirit of my invention or sacrificing its advantages.

Having fully described my invention, what I claim as new and desire to secure by Letters Patent, is:

The combination with a thermometer of substantially triangular cross sectional form, one side of said triangle forming the back of the thermometer, and the other sides terminating in a front reading edge arranged longitudinally of the thermometer, of an enlarged rectangular head having flat side walls, one of said flat walls being arranged parallel to the back of the thermometer to facilitate supporting the reading edge of the thermometer in proper position in taking a reading.

In testimony that I claim the foregoing as my invention I have signed my name this 28th day of June, 1929.

FRANK J. ADDIS.